G. COX.
DIRIGIBLE HEADLIGHT.
APPLICATION FILED JUNE 12, 1919.

1,397,754.

Patented Nov. 22, 1921.

WITNESSES,
William W. French
Margaret A. French

INVENTOR
GEORGE. COX.
BY Charles Albert French
ATTORNEY.

UNITED STATES PATENT OFFICE.

GEORGE COX, OF BLACK EARTH, WISCONSIN.

DIRIGIBLE HEADLIGHT.

1,397,754.  Specification of Letters Patent.  Patented Nov. 22, 1921.

Application filed June 12, 1919. Serial No. 303,758.

*To all whom it may concern:*

Be it known that I, GEORGE COX, a citizen of the United States, residing at Black Earth, in the county of Dane and State of Wisconsin, have invented certain new and useful Improvements in Dirigible Headlights, of which the following is a specification.

My invention relates to dirigible headlights operated from a connection hooked into the steering gear of the machine and kept in contact by a tension spring; and the objects of my invention are, first, cheapness of construction; second, ease of attaching or detaching; and, third, flexibility and adaptability to the work required.

I attain these objects by the mechanism shown in the accompanying drawing in which—

Figure 1:
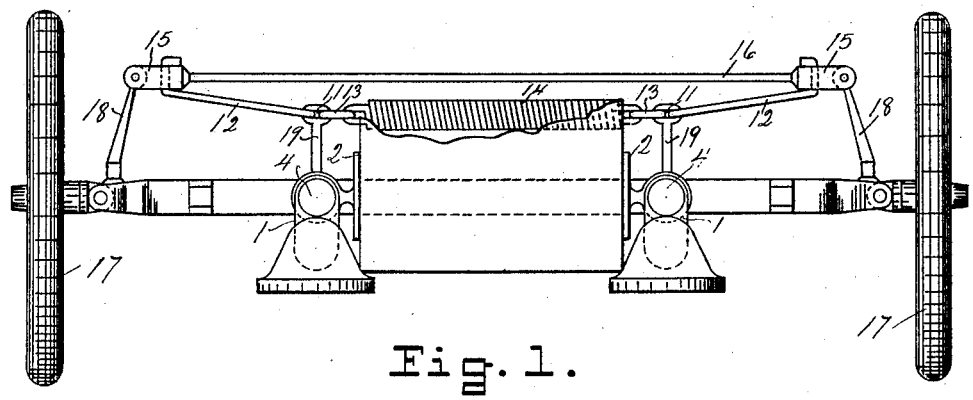
Figure 3:
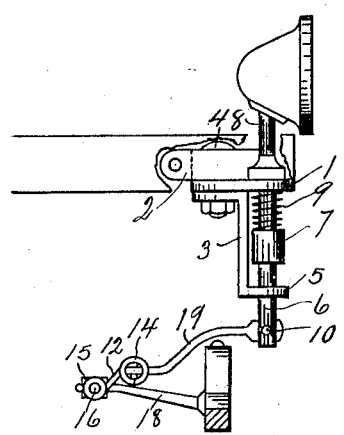
Figure 2:
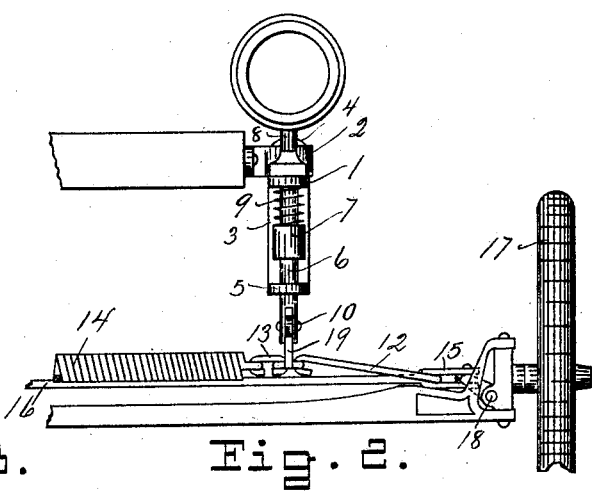

Figure 1, is a plan;
Fig. 2, is a front elevation;
Fig. 3, is a side elevation;

Similar numerals refer to similar parts throughout the several views.

A plate 1, is secured at its rear end under the lamp bracket 2, and extends forward therefrom. A hanger 3, depends from the under side of the plate 1, and is secured to the bracket 2, by a bolt 4, which passes through the members 1, 2, and 3. Said bracket 3, extends downward a distance and is turned forward at an angle of 90 degrees and is provided with a round hole approximate the center of the horizontal lower portion 5. A shaft 6, bifurcated at the lower end is disposed in a vertical position through the round hole in member 5, and a sleeve 7, secures the shaft to the lower end of the lamp standard 8, which is journaled in the front end of plate 1. A spring 9 is mounted on the lamp standard between the plate 1, and the sleeve 7. Within the slot at the bottom of the shaft 6, is pivotally attached the front end of a curved arm 19, by a pin 10. Said arm extends backward and downward between the front axle and spring when attached to a motor vehicle. A slightly elongated hole 11, is located in the lower end of the arm into which is hooked the inner end of a rod 12, and the outer end of link 13. The inner end of the link is connected to a tension spring 14, and the outer end of the rod 12, is hooked into the connection 15, on the transverse steering rod 16, of a machine where it is attached to the arm 18.

It will be seen by reference to Figs. 1 and 2, how the rod 16, connected to the arm 19, by the rod 12, will move the lamp standard 8, and cause the light to follow the direction that the front wheels are traveling.

Having thus described my invention I claim.

In a dirigible headlight, the combination with the frame of a motor driven vehicle and a steering rod for the wheels thereof, of rotatable headlight supporting standards and brackets, a plate secured at its rear and under each of the said brackets and extending forward therefrom, hangers depending from the underside of said plates and secured to said brackets, said hangers extending downward a distance and turned forward at approximately 90 degrees, annular apertures located approximately the center line of the horizontal lower portions of said hangers, shafts threaded at their upper ends and bifurcated at their lower ends and vertically disposed through the annular apertures aforesaid, sleeves secured to the lower portion of lamp supporting standards, resilient means disposed between said plates and said sleeves, arms pivotally disposed within the bifurcated portions of shafts aforesaid and extending backward and downward between the front axle and spring of a motor vehicle, elongated apertures located at the lower end of said arms, rods having their inner ends adapted to engage said apertures and their outer ends connected to the transverse steering rod of the vehicle, links the outer ends of which are adapted to engage the said apertures, a spring disposed between the arms aforesaid and engaging the links as described.

In testimony whereof I affix my signature in the presence of two subscribing witnesses.

GEORGE COX.

Witnesses:
IVER SIMLEY,
CLARA E. ZWALD.